United States Patent [19]

Martinson

[11] Patent Number: 4,630,054
[45] Date of Patent: Dec. 16, 1986

[54] RADAR DETECTION AND SIGNAL PROCESSING CIRCUIT

[75] Inventor: Glen D. Martinson, Oakville, Canada

[73] Assignee: B.E.L.-Tronics Limited, Mississauga, Canada

[21] Appl. No.: 604,953

[22] Filed: Apr. 27, 1984

[30] Foreign Application Priority Data

Jan. 6, 1984 [CA] Canada .................................. 444843

[51] Int. Cl.⁴ .............................................. G01S 7/36
[52] U.S. Cl. .................................... 342/20; 455/227
[58] Field of Search .............. 343/5 CE, 5 CF, 5 DP, 343/5 W, 16 M, 18 E, 7 A, 5 PD; 455/145–147, 226–227, 229

[56] References Cited

U.S. PATENT DOCUMENTS

| | | | |
|---|---|---|---|
| 3,094,663 | 8/1962 | Siegel | 455/324 |
| 3,257,659 | 12/1963 | Siegel | 343/18 D |
| 3,550,008 | 9/1967 | Bright | 375/93 |
| 4,157,550 | 6/1979 | Reid et al. | 343/700 MS |
| 4,196,393 | 4/1980 | Schweitzer | 340/600 |
| 4,315,261 | 2/1982 | Mosher | 343/18 E |

FOREIGN PATENT DOCUMENTS 2014400 10/1971 Fed. Rep. of Germany ... 343/5 DP

OTHER PUBLICATIONS

*Electronic Design with Off-the-Shelf Integrated Circuits*, by Z. Meiksin and P. Thackray; Prentice-Hall; Englewood Cliffs, N.J., 1984; pp. 239–240.

Primary Examiner—Thomas H. Tarcza
Assistant Examiner—Bernarr Earl Gregory
Attorney, Agent, or Firm—Donald E. Hewson

[57] ABSTRACT

Radar detection and signal processing circuits are provided where, following a front end having an RF and local oscillator mixer to an I.F., which is then further mixed against a signal from a swept frequency oscillator, in the presence of a microwave frequency signal, the output of a band pass filter goes to a detector for frequency modulated intermediate frequency signals, and that detector has at least a first output signal that is fed to two pairs of complementary paired comparators, the outputs of which are set to low and high threshold levels. The first pair of complementary comparators has a low threshold level output which is examined by a microprocessor for the incidence of detected low threshold signal in a number of spaced cells—as determined by a clock which divides the detector output into time cells of the sweep period of the swept oscillator. Signal processing is provided so that the incidence of signals in a pair of spaced cells over a given number of consecutive sweeps causes an alarm. Likewise, a high threshold output is examined for the incidence of a detected high threshold signal in a pair of spaced cells over a different, lower number of consecutive sweeps, causes an alarm. The sensitivity of the circuit may adjust up or down according to the number of low threshold signals that are detected; or dynamically if too many low threshold signals are detected in a small group of time cells.

17 Claims, 5 Drawing Figures

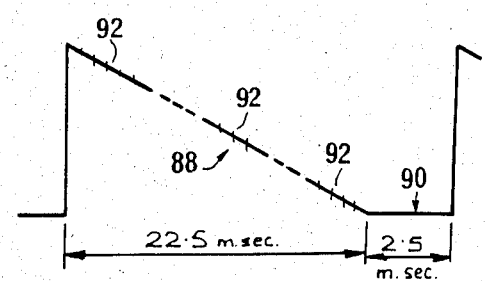
FIG.2
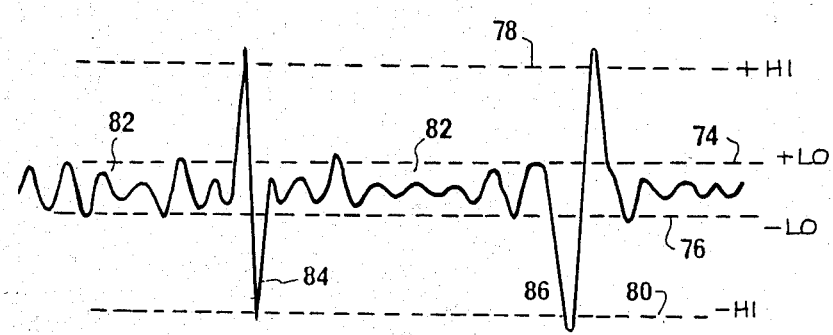
FIG.3
```
Cell Number      x     x+1    x+2    x+3    - -    2x    2x+1
Sweep   1        01    00     00     00     - -    01    00
Sweep   2        10    00     00     01     - -    10    01
Sweep   3        11    00     01     00     - -    11    00
RESET            00    00     00     00     - -    00    00
Sweep   4        01    00     01     01     - -    01    01
Sweep   5        10    01     10     00     - -    10    10
Sweep   6        11    00     00     00     - -    11    00
```
FIG.4
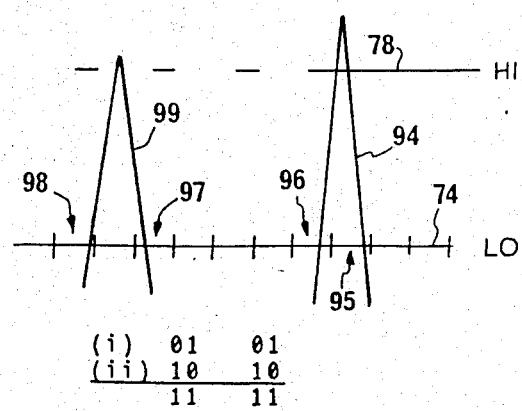
```
(i)    01    01
(ii)   10    10
       11    11
```
FIG.5

RADAR DETECTION AND SIGNAL PROCESSING CIRCUIT

FIELD OF THE INVENTION

This invention relates to radar detection and signal processing circuits, and particularly circuits for the detection of microwave frequency signals such as those that are present in the K-band and X-band used by police or intrusion radar devices. The present invention provides signal processing circuits that are microprocessor controlled, whereby the sensitivity of the circuits to signals that are being continuously detected may be adjusted not only to avoid premature alarm conditions, but also to maintain the sensitivity so as to distinguish between noise and the signals to be detected.

BACKGROUND OF THE INVENTION

Radar detectors have been known for some considerable time. Police radar devices that are used in the detection and measuring of the speed of moving vehicles, and also intrusion and zone security devices that are used in buildings, operate in two designated frequency bands. They are the X band, at 10.525 GHz, and the K band at 24.150 GHz. Presently, all radar operating devices intended for speed detection and building intrusion or zone security purposes operate at one or the other of those frequencies. Moreover, because of the increased use of building and zone security devices, and the tendency of police radar to be used in pulsed manner—that is, only infrequently and only when the operator believes he has a speeding vehicle within his range —it has become more necessary to provide radar detectors that not only detect a true signal and give an appropriate warning, it is also desirable that radar detectors should not give false signals.

One way of overcoming an excessive number of false signals is to decrease the sensitivity of a radar detector; but that creates the problem that an operating radar may not be detected until the vehicle carrying the detector is within the accurate measuring range of the radar device. Generally, radar devices such as police radar give off a field at their operating frequency that extends for a much greater range than the range at which they will give accurate and meaningful vehicle speed information; and it is those low level and long range signals that are required to be picked up. At the same time, it is desirable that the detector should not give off an alarm each time that a radar device in a building for intruder detection or zone security is detected, due to its radiated field.

Thus, it becomes desirable to provide a radar detector that will automatically adjust its sensitivity; and moreover it is desirable to provide a radar detector that will give an indication as to the signal strength of a signal that is causing an alarm. Still further, it is desirable that the radar detector should give an almost instantaneous alarm in the event of a high level signal that can be identified as being from such as a police radar unit, as opposed to a high level signal that might be detected as a moving vehicle drives past a building having a zone security radar system with high level radiation.

The prior art includes REID et al U.S. Pat. No. 4,157,550, issued June 5, 1979. That patent teaches a microwave detector that operates at both of the X-band and K-band frequencies, but is particularly directed to the mounting of the detection diodes with respect to the horn.

SCHWEITZER U.S. Pat. No. 4,196,393 issued Apr. 1, 1980 teaches a further X-band or K-band operating microwave signal detector, and that patent also is mroe related to the mounting of the detection devices, with little attention to signal handling.

Yet a further radar signal detector is taught in MOSHER U.S. Pat. No. 4,315,261, issued Feb. 9, 1982. Mosher mixes received radar signals with a swept frequency signal, that is then passed to a narrow band FM discriminator, but that is a frequency compression discriminator.

In contradistinction to the prior art, the present invention is particularly directed to the provision of signal processing circuits, by which false alarm conditions may be substantially avoided.

Indeed, the actual detection and front end of a radar detection device is beyond the scope of the present invention, but specific examples are given by way of illustration. A novel horn construction which is particularly adapted for use with radar detection and signal processing circuits according to the present invention is taught in U.S. Pat. No. 4,571,593 issued Feb. 18, 1986, in the name of the present inventor and assigned to a common Assignee, and filed of even date herewith.

It can be assumed, for example, that circuits according to the present invention are particularly adapted to operate at 10.525 GHz (the X-band) or 24.150 GHz (the K-band); and that signals at either of those frequencies will be mixed with a local oscillator signal. In any event, by properly mixing an RF signal at either frequency with a local oscillator signal or a harmonic thereof, an intermediate frequency of 1.033 GHz may be obtained. How that intermediate frequency signal—which only exists in the presence of a detected radar or microwave signal at either of the X-band or K-band frequencies—is processed, and how that signal may be measured as to its strength, and how the sensitivity of processing may be adjusted according to background noise conditions, are features of the present invention that are described in greater detail hereafter.

What the present invention provides is a radar detection and signal processing circuit where, once an intermediate frequency signal from a first mixer is obtained, it is fed to a second mixer together with a signal with a swept frequency oscillator, with the output from that second mixer being fed to a band pass filter. Thus, in the presence of a microwave frequency signal that has been converted to the first intermediate frequency, there is a pair of signals that are spaced from the band pass filter centre frequency. Both signals have a relatively narrow (400 KHz) band width; and each is a burst of signals in a substantially sinusoidal envelope. The first occurs when the output from the varactor tuned oscillator 24 is higher than the IF signal by an amount equal to the band pass filter centre frequency (10 MHz), and the second occurs when the output from the varactor tuned oscillator is lower than the IF signal frequency by the same amount. Those signals may then be processed as to their incidence at either low or high thresholds, on successive sweeps, and as to the incidence of signals above the low threshold level that may be distinguished from noise; whereby alarm signals may be given substantially only in the presence of a detected radar signal from such as a police radar, in the X-band or K-band frequencies (or such other frequency as may be assigned in the future, and for which appropriate detection and mixing circuitry may then be readily devised). [Of course, in this invention, as briefly discussed above and described in detail hereafter, it will be appreciated that reference to the second miser being fed by a signal from a swept frequency oscillator could also be with respect to the first mixer; that is, the first mixer could be fed with a signal from a swept frequency oscillator while the second mixer is fed with a signal from a fixed frequency low oscillator, together with the data signal being processed.]

BRIEF DESCRIPTION OF THE DRAWINGS

The specific objects and features of the present invention are described in greater detail hereafter, in association with the accompanying drawings, in which:

FIG. 2 is a sketkch showing a typical output from a ramp generator superimposed on a clock;

FIG. 3 is a sketch of a typical or representative wave form of the sort to be detected by the low and high threshold circuitry;

FIG. 4 is a table showing the bit settings in a number of time cells on successive sweeps, during low level alarm detection; and FIG. 5 is a sketch of a signal excursion that may occur in high level detection circumstances.

DESCRIPTION OF THE PREFERRED EMBODIMENTS

Figure 1:
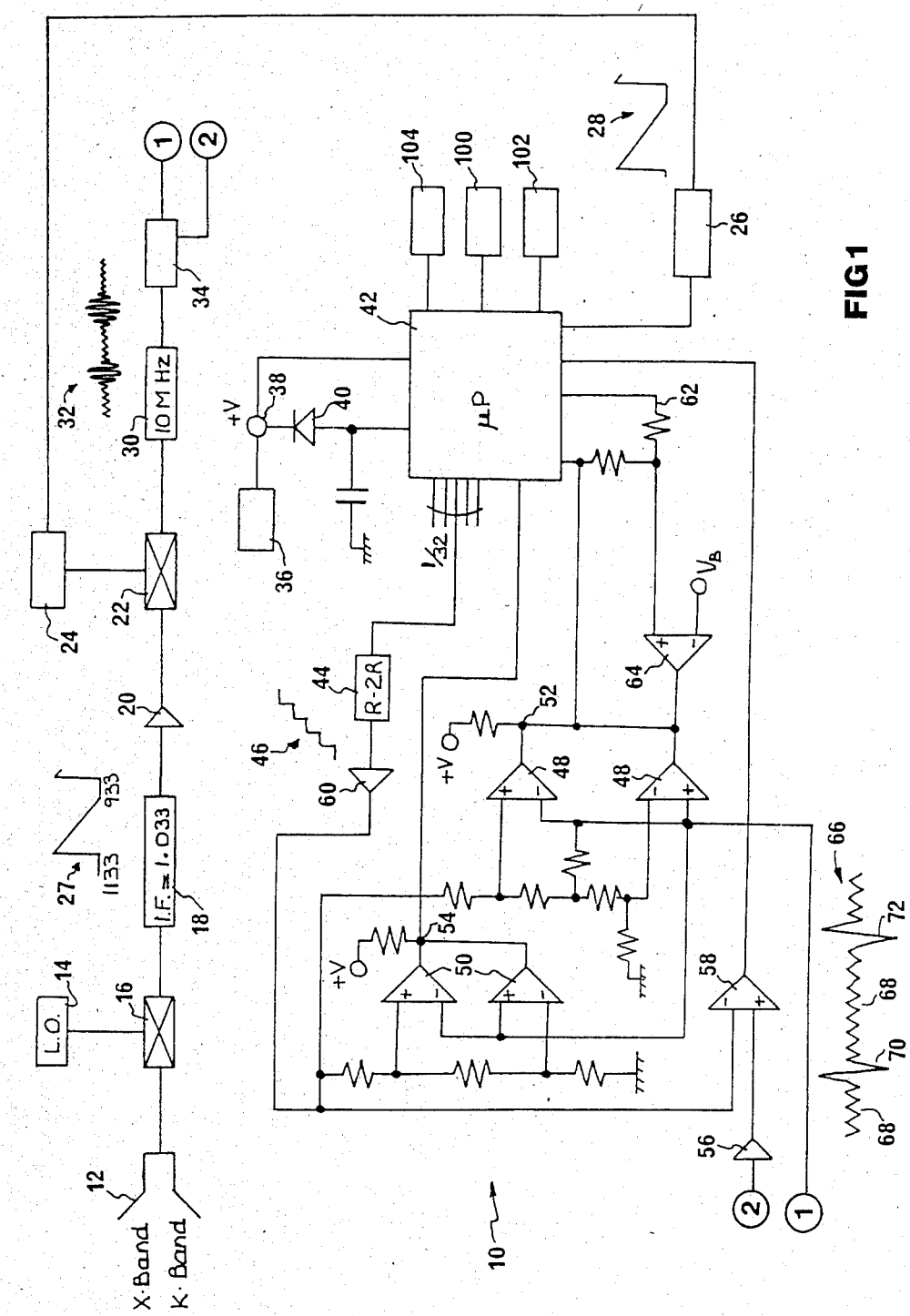
FIG. 1 is a block schematic showing, in two sections, and to a greater degree of specificity in some areas than others, the general circuit according to the present invention.

As noted, the present invention provides a radar detection and signal processing circuit, which is generally indicated at 10 and is shown schematically and in block form in FIG. 1. Because the present invention is particularly directed to radar detectors that are intended for use to detect the presence of microwave energy at the X-band or K-band frequencies —as used by police radar devices, for example—the antenna 12 that is shown in FIG. 1 is shown as being a dual-frequency antenna for those two microwave bands. Of course, the features of the present invention may be adapted and used in respect of other microwave energy detection and signal processing purposes, such as proximity devices or other military or national security purposes.

In any event, the circuit of FIG. 1 includes a local oscillator 14 and a first mixer 16, which has an output in the event of the presence of X-band or K-band signals at the antenna 12. The output from the mixer 16 is fed to an I.F. circuit 18 which may include an amplifier 20 and which also includes a second mixer 22.

At this point, it may be noted that the antenna 12 may be a horn as taught in the co-pending application referred to above, it may be a conventional horn, or it may be a microstrip antenna; providing only that, in the presence of X-band or K-band microwave signals from radar units, there is an output signal from the antenna 12 which may be fed to the mixer 16. That output would be at 10.525 GHz for the X-band, or 24.150 GHz for the K-band.

The output from the local oscillator 14 is usually at one of two frequencies. Normally, it may be at 11.558 GHz; so that the primary local oscillator output or its second harmonic, when mixed with an X-band or K-band signal, respectively, will in any event result in an I.F. frequency output from the mixer at 1.033 GHz. The local oscillator 14 may also have an output frequency of 5.779 GHz; in which case there is a subharmonic pump mixer technology used with the mixer 16, where the X-band signal is mixed with the second harmonic of the local oscillator frequency, and the K-band signal is mixed with the fourth harmonic of the local oscillator frequency.

It should also be noted that the local oscillator is most usually a Gunn or transistor oscillator, and that the mixer would normally comprise one or a pair of diodes—usually Schottky diodes.

Given that there is an X-band or K-band signal detected by antenna 12, an I.F. signal is fed to the second mixer 22. That mixer also receives a signal from a varactor tuned oscillator, or other swept frequency oscillator, indicated at 24 in FIG. 1; and conveniently, the output of the varactor tuned oscillator is a signal which varies in frequency from 1133 MHz (1.133 GHz) to 933 MHz (0.933 GHz) as indicated by the representative trace shown at 27 in FIG. 1. The varactor tuned oscillator 24 may be driven from a ramp generator 26, which has an output such as is shown at 28.

The output of the second mixer 22 is fed to a 10 MHz band pass filter 30, whose output may have the appearance as shown at 32 in FIG. 1. That signal is, in turn, fed to a detector for frequency modulated intermediate frequency signals, shown at 34; and the detector has two outputs that are shown at "1" and "2" which are connected to similarly numbered points in the lower portion of FIG. 1 as it is presented.

In the lower portion of FIG. 1, a power supply 36 is shown, which may have one or more voltage outputs at appropriate voltages for use by the various components that comprise the overall radar detection and signal processing circuit. Connected to the power supply 36, or as a reference terminal from the power supply, there is a reference voltage terminal 38 which, in turn, is connected through a diode 40 to a microprocessor 42. Suitable switch arrangements are made for power-up, and for power-reset of the microprocessor 42 through the diode 40.

There is also connected to the microprocessor 42 a digital to analog converter 44, which may in fact be connected through 4 or 5 lines—usually 5—and which is an "R-2R matter". If the converter 44 is connected to the microprocessor through 5 lines, it then becomes a 5 bit, 32 level converter that has an output somewhat as shown at 46.

The first output from the detector 34, at "1", is fed to a first pair of complementary comparators 48, and also to a second pair of complementary comparators 50. The output of the first complementary comparators 48 is tied together at 52, and is the low threshold level output as discussed hereafter. Similarly, the output of the second pair of complementary comparators 50 is tied together at 54, and is the high threshold level output as discussed hereafter. Each of the low threshold level and the high threshold level outputs are fed to the microprocessor 42.

As described in greater detail hereafter, the second output from the detector 34, at "2" is an output signal that is proportional to the signal strength received at the antenna 12. It is fed, through a buffer amplifier 56, to a comparator 58, whose other input is the output of the R-2R Ladder 44 through a buffer amplifier 60; and the output of the comparator 58 is also fed to the microprocessor 42, as described hereafter.

The other circuit components that are shown in FIG. 1 include a latch reset line 62, which is connected to one side of a comparator 64 which forms a latch to store detection in each time cell, as discussed hereafter. The other side of the comparator 64 is connected to a bias voltage, and the output of the comparator 64 is connected to the low threshold level output of the complementary paired comparators 48, at 52.

OPERATING DESCRIPTION

The description of the signal handling up to at least the output from the band pass filter 30 is relevant not only to the present invention but is descriptive of fairly conventional dual wave band microwave detection and I.F. generation techniques. What follows, however, is a description of the signal handling components of FIG. 1, with some reference to the differences between signal handling according to the present invention and prior radar detectors. As mentioned, FIG. 1 is a block schematic, with certain areas in greater detail than others, for purposes of the following discussion; which is also made in association with FIGS. 2, 3, 4 and 5.

Because the detector 34 has an output at "2" that has a voltage which is proportional to the signal strength of the signal received at the antenna 12, to the limit of the voltage output from the detector 34, and because there is noise at the output of the detector 34 at "1" and "2" together with a pair of signals (one positive going and one negative going) when there is a signal detected by the antenna 12, the normal approach would be to set a threshold below which most of the noise resides and to simply look for signals that go through that threshold; and to create an alarm condition when signals are detected that go through the threshold. That is the usual operation of prior art devices, where the threshold, and thus the sensitivity, may be manually adjusted by the operation of a suitable variable resistor or otherwise. In the prior art devices, if the threshold is set too low, then any excessive noise would cause an alarm condition; and if the threshold is set too high, then a genuine alarm may go unnoticed because the signals that indicate the alarm condition fail to exceed the threshold level.

A typical output from the detector 34 is shown at 66; and it comprises noise as at 68, and a pair of signals (first positive going and the second negative going) at 70 and 72. It is the signals 70 and 72 that are being "looked for" for the circuits of the present invention, and it is the presence of those signals and—in some respects—their spaced time relationships to each other that determine the various reactions that the circuits of the present invention may have.

First, according to the present invention, there are two thresholds that are set—in a manner discussed hereafter—and they are both positive and negative levels. Thus, as shown in FIG. 3, where a typical noisy signal is shown that has excursions going through the high threshold levels, there is a pair of low threshold levels 74 and 76, and a pair of high threshold levels 78 and 80. The signal shown in FIG. 3 has noise 82, and a pair of signals 84 and 86 that indicate the presence of a high level microwave frequency signal at the receiving antenna 12.

While it is not necessary, it has been found convenient that the high and low threshold levels have a fixed ratio to each other. That is, as the low level threshold increases, so does the high level threshold in a proportionate amount so as to keep the ratio constant, and vice versa if the low threshold decreases. Conveniently, the ratio may be approximately 3:1, but of course it may be more or less.

It is also convenient to note that each of the pairs of complementary comparators 48 and 50 are such that they are held high, and that they go to a low output (being binary in their output) when they have a signal that is detected at any instant in time.

First, when any microwave signal is being detected, it is the number of low level detections per sweep of the varactor tuned oscillator 24 as controlled by the ramp generator 26 that is first looked at by the microprocessor, so as to adjust the sensitivity of detection. For example, it is accepted that there will always be noise, and because of the unique signal handling that is described hereafter, it is possible to distinguish the noise from genuine signals at low level. (High level signals are handled differently, also as described hereafter, and cause an almost immediate alarm as opposed to a somewhat longer process of reviewing detected signals to determine the existence of alarm signals from noise.)

As noted in FIG. 2, which essentially replicates the traces as shown at 27 and 28 in FIG. 1, the sweep period from the ramp generator is 25 mSec, comprised of 22.5 m Sec of sweep time followed by a 2.5 mSec reset period. The sweep time trace is indicated at 88 in FIG. 2, and the reset time trace is indicated at 90. Also, there is shown in FIG. 2 a number of divisions 92 on the sweep time 88; and each of those divisions 92 is a time cell. In the operating embodiment of the present invention, the sweep time 88 is divided into 100 time cells 92, the time cells being determined by and referenced against a clock that is running in the microprocessor 42.

If the microprocessor noted more than approximately 6 to 8 instances of low level detection per sweep—the actual detection and tracking of those detections are discussed hereafter—, then the threshold level is adjusted by adjusting the count to the R-2R Ladder 44 and therefore the output from the buffer amplifier 60; and obviously the output level from the amplifier 60 can go up or down so that the microprocessor 42 "knows" that approximately 6 to 8 low threshold level detections per sweep are noted. Moreover, the sweep time 88 is also divided into 10 groups of 10 cells 92; and if the microprocessor 42 notes more than one low threshold level detection per group of 10 cells 92, it will increment at the output 46 from the R-2R Ladder 44 to increase the level from the output of the amplifier 60, thereby to increase the low threshold level.

Thus, if more than 6 to 8 detections per sweep are noted, then the initial low threshold level is too low, and it is increased simply by increasing the output from the R-2R Ladder 44 and therefore the output from the buffer amplifier 60. Conversely, if fewer than 3 or 4 detections per sweep are noted, then the microprocessor 42 will decrement the output from the R-2R Ladder 44 to decrease the output level, and thereby to lower the initial low level threshold. Thus, the sensitivity is adjusted; and it should be noted that such adjustments of the initial low level threshold are relatively long term matters—that is, although a reference may be made at the end of each sweep (or even after every 5 or 10 sweeps), it is not common that there is a continuously varying adjustment of the initial low threshold level by adjustment of the output from the R-2R Ladder 44.

However, it should also be noted that if the microprocessor notes more than one low level detection or penetration in any group of ten time cells—the sweep 88 being divided into ten groups of ten cells each—the output of the R-2R Ladder 44 will be incremented so as to increase the low threshold level. This gives dynamic low threshold adjustment, and it is possible that one or more dynamic adjustments may be made in any single sweep. It should also be noted, of course, that any single adjustment to the low threshold level ils made by incrementing or decrementing the output of the R-2R Ladder 44 by a single count or step at any one time (1 of 32, or 1 of 16).

LOW THRESHOLD DETECTION

The signal processing, according to the present invention, is set up so that the first pair of complementary comparators 48 which has the low threshold level output is examined by the microprocessor 42, against the plurality of time cells 92 as they are indicated in FIG. 2. In general, it can be said that an alarm condition will occur when there is an incidence of detected low threshold signals at a level above the low threshold level 74 or 76 as shown in FIG. 3, in a pair of spaced cells 92 over a given number of consecutive sweeps of the ramp generator 26 or the varactor tuned oscillator 24 under its control. It is accepted that, as noted above, on any sweep the microprocessor expects to look at approximately 6 to 8 excursions of signal from the low threshold comparators 48 past the low threshold level 74 or 76. (As previously stated, and except as discussed hereafter with respect to alarm conditions, if there are fewer than 3 or 4 detected low threshold signals, the sensitivity of the circuits is too low; and if there are any more than 6 to 8 detections, the sensitivity is too high.) However, because the sweep period 88 is divided into 100 cells 92, it is possible to examine the incidence of a low threshold signal in any one of those 100 cells for each sweep 88. As a convenient and satistically probably determination, the microprocessor 42 is set so that if it sees detections in a pair of spaced cells—which cells are normally 7 to 13 cells apart as discussed hereafter—for each set of 2 consecutive sets of 3 consecutive sweeps, then an alarm status is determined to exist. This is because the statistical chances of the same noise occurring in a pair of spaced cells for 6 successive sweeps is so very small that it can be realistically disregarded. The spacing of 7 to 13 cells is such that the cells are approximately 2.2 mSec apart, and that is the approximate distance of the pair of signals 70 and 72 from trace 66 in FIG. 1, or 84 and 86 from the trace in FIG. 3, that indicate the existence of an X-band or K-band being received by the antenna 12.

Assuming that several bytes of memory exist to store detection memory, it is convenient to assign four cells per byte; that is, it is convenient to assign 2 bits per cell with a possible count of a binary 3 (11) in each cell. The rule is then made that, on each successive sweep, each cell that has a detection in it is incremented by a binary 1 (01), and each cell that has no detection goes to binary 0 (00), after each sweep.

Referring now to FIG. 4, a table is shown for a number of cells that are some of the 100 cells that are spaced along each sweep 88 as it occurs; except that each cell is designated because it is the same cells that are going to be looked at. Thus, cells X, X+1, X+2, X+3, 2X, and 2X+1, are shown as being exemplary; and, it is noted that cells X and 2X are 10 cells apart in this case. They may, of course, be 7 to 13 cells apart as noted above.

On sweep 1—the first sweep when signals from antenna 12 are noted but are of low threshold level, comparators 48 will have noted a detection only on cells X and 2X. Each of those cells is therefore shown to have a binary 1 (01) in it, and all of the other cells are shown to have a detection.

On the next sweep, sweep 2, a signal continues to appear in each of cells X and 2X, and each of them is incremented by a binary 1 (01) to become a binary 2 (10). It will also be noted that further signals are detected in cells X+3 and 2X+1.

However, on sweep 3, each of cells X and 2X continues to have a signal, and each is again incremented by a binary 1 (01) to become a binary 3 (11). In this instance, it is noted that cell X+2 is the only other cell that has a detected signal, and the others cells have reverted to 0.

Now, after the third sweep, it is noted that cells X and 2X are full (having only two bit positions) and that each has a binary 3 in them. At this point, the microprocessor 42 sets a potential alarm flag, and resets all of the cells to 0.

Now, continuing through sweeps 4, 5, and 6, it is noted that again there is a detected signal—an incidence—in each sweep in each of cells X and 2X, and that each of those cells has consistently been incremented by binary 1 (01) so that at the end of sweep 6, each of cells X and 2X is set at a binary 3 (11). The microprocessor then creates an alarm status, because each of cells X and 2X has had a signal detected in them for 6 consecutive sweeps, and none of the other cells have. Since the statistical likelihood of noise occurring in such a manner as to create a patterned incidence of detections in two cells that are spaced 10 cells apart is so low that it can be disregarded, an alarm status can be said to have occurred. Of course, the alarm status signaling is carried out because the microprocessor will try to set a flag after sweep 6 because it has two binary 3s in the two spaced cells apart, but since a flag is already set, the microprocessor will instead initiate its alarm indication sequence. It should also be noted that the period for the 6 consecutive sweeps to have occurred with a signal in two spaced cells, is 150 mSec.

It is not necessary that the second set of detections should have occurred in exactly the same cells as the first set of detections, but in view of the very short period of time that has occurred, it is probable that it will be the same cells that have had the detections noted in them. In any event, as stated, it is necessary that there should be six consecutive sweeps—that is, two consecutive sets of three consecutive sweeps—in which there should be pairs of cells that are spaced 7 to 13 cells apart and that have detections on each sweep. The first set of three consecutive sweeps will have set the potential alarm flag, and the next succeeding set of three consecutive sweeps causes the alarm status to be initiated.

The latch reset line 62 from the microprocessor is connected to one input of comparator latch 64, which acts as a latch to hold data in each cell until read by the microprocessor 42. That is, the output from the complementary paired comparators 48 is held down, in each instance when there is a signal detected in that cell, and it is then reset at the end of the cell period to be ready for analysis of the next cell.

HIGH THRESHOLD DETECTION

Sometimes, an instance will occur when a strong signal is detected, where the first time the signal is detected it is strong enough to exceed either the positive or negative high threshold levels 78 or 80. This occurs, for example, with pulsed radar where the radar is operated only in bursts, having a minimum pulse width of about 50 m Sec, but having a burst only once every 1 to 1.5 seconds. It will be noted that, with pulsed radar, having a pulse width of only 50 m Sec. that pulse width is only one third of the period of 150 m Sec. required for low level threshold detection, as discussed immediately above.

Whereas, with low threshold detection, there is a requirement that there should be a signal in a pair of spaced cells for two consecutive sets of three consecutive sweeps—usually the same pair of spaced cells, but not necessarily so—high threshold detection requires only that there should be signal detection in the same cells for two consecutive sweeps, coupled with the pressure of a signal above the high threshold level.

At the end of each sweep, the microprocessor 42 will look for two penetrations of the high threshold level that are, say, anywhere from 7 to 13 cells apart. (Of course, it will also have noted a signal in those cells and/or adjacent cells at the low threshold level.) In any event, if two penetrations are noted that are 7 to 13 cells apart, the microprocessor sets the low flag—as if the two cells each had a binary 3 (11) in them, plus it sets another flag but it does not reset the cells to 0. On the next sweep, the microprocessor will ignore everything that has been detected by the complementary low threshold comparators 48, but it will continue to track the presence or absence of signals in each cell in the event that the detected high level signals are false—the reason for at least two successive sweeps. On the second sweep, where the high level threshold penetrations have been noted in the same cells that are 7 to 13 cells apart, the microprocessor will add a binary 2 (10) to each of the cells where the detection has occurred. Because there should already be a binary 1 (01) in those cells due to the fact that there had also to be a low threshold penetration by the signals, there would now be a binary 3 (11) in those two cells. In this case, where the cells are 7 to 13 cells apart, and they now each have a binary 3 in them, and because the low flag has already been set, an alarm status is declared and the alarm indication sequence is initiated by the microprocessor.

For convenience, the high threshold signal output from the complementary comparators 50 at 54 is fed to the microprocessor 42 on the interrupt line of the microprocessor, so that there is no need to latch and hold those cells for examination at the end of the cell period.

FIG. 5 shows a typical penetration on a second sweep by a signal 94 past the positive high threshold level 78, and of course pass the positive low threshold 74. It is noted on the table shown on FIG. 5 that, on the first sweep, each of cells 96 would have a binary 1 (01) set in them because of the excursion of the signal past the low threshold level 74. Thus, the excursion of the signal again past the high threshold level 78 will, because of the flag that has been previously set, add a binary 2 (10) to each cell 96 so that each cell will then have a binary 3 (11) in it. It will also be noted that cell 98 has had signal 99, as has cell 97; but it will be taken that cells 98 and 96 are 7 to 13 cells apart and have had detections in them together with a high level penetration, as discussed above.

In the event of an alarm status being initiated, either as a consequence of low threshold detection or high threshold detection, the circuits of the present invention will output signals such as an audible alarm—a chirp, tweet or buzz—from the audible alarm output device 100; or a visual alarm such as a flashing or illuminated lamp or LED, from the visual alarm device 102. The audible alarm device 100, and possibly also the visual alarm device 102 but more usually a signal level indicator 104, are used for signal level indication as discussed immediately hereafter.

SIGNAL LEVEL DETECTION

It is sometimes desired that there should be an indication of the signal level that is being received by the antenna 12. This is particularly required in the event of a fast moving automobile, or particularly in the event of closing automobiles where the detector is in one vehicle going in a first direction and a radar unit is in another vehicle coming in the opposite direction. Visual and audible signals may be given as to signal strength; and conveniently, while a meter may be used, it is more easily noted when the signal level indicator 104 has a plurality of three or five, or more, LEDs, that are such that as the signal level increases 1 then 2 and then more of the LEDs are illuminated. Indeed, it can be arranged that when all of the LEDs are illuminated, and the signal strength continues to increase, they will then begin to flash.

In any event, for any signal level indication to meaningfully occur, and for the sequence to be initiated, it is necessary to note that the output at "2" from the detector 34 is such that the voltage level varies with the signal level strength of the signal received by the antenna 12 (at least to the limit of the voltage output from the detector 34).

It will be recalled that, for each sweep, there is a reset interval 90, of 2.5 m Sec. During the reset interval, if an alarm status has been set, due to either a high threshold level signal or a low threshold level signal, the level of the signal strength can be determined. In any event, when the alarm status has been set, the R-2R Ladder 44 is used as one of the inputs to a comparator 58, with the other input being the input from "2" through a suitable amplifier 56. The output of the comparator 58 is fed to the microprocessor, which steps the R-2R Ladder 44 up or down as necessary, until a match is read (the comparator output changes state). As previously stated, the R-2R Ladder may be a 4 bit 16 level ladder; but more conveniently and for better accuracy, it is a 5 bit, 32 level ladder. The level of the ladder 44 when a match occurs at comparator 58 is then read, and an alarm rate may be adjusted accordingly.

During the time that an alarm status is in effect, the output from the R-2R Ladder 44 is being used for determining the signal level. This is done during the reset interval, when the outputs from the complementary paired comparators 48 are not being read by the microprocessor 42. Thus, the microprocessor is able to ready the bit level information as to the output of the R-2R Ladder 44, and to use that information to set the alarm pulse rate. Thus, one or more of the LEDs in the signal level indicator 104—if present—wil be illuminated, or they may all be caused to flash simultaneously; and an audible alarm which may be a series of sounds, may be initiated. The microprocessor 42 may also set itself to adjust the number of sweeps between alarms, according to the signal strength, in such a manner that the number of sweeps between alarms is inversely proportional to the signal strength.

It is also possible that the sensitivity of the circuits may be reduced by way of the manual operation of a switch, so that while the circuit will continue to detect signals as discussed above, it may be set into a mode such that no alarm status will occur until the output of the detector 34 at "2" reaches a predetermined level.

There may also be a switch selectable delay that is built into the circuit 10 according to the present invention, so as to distinguish between high radiation level intrusion alarms and a radar unit to be detected. However, since a moving vehicle that drives past an intrusion alarm would have a gradual build up of signal, the sudden appearance of a very fast signal will override the delay so as to give an alarm situation. Otherwise, the delay may be as much as 5 or 6 seconds. That time delay can normally be afforded because it is expected that any driver who uses a radar detector does so to avoid revenue-located speed radar traps that are operated by many municipalities or other government agencies, or he does so to avoid an unnecessary speeding ticket that might have occurred due to a lapse of his own concentration on the legal speed limit. Nonetheless, the radar detector has sufficient sensitivity that a gradually building signal, at resonable vehicle speeds, will permit the passage of time of 5 or 6 seconds before it is necessary to give an alarm, due to the sensitivity of the radar detector and therefore its ability to receive signals at a range far beyond the measuring range of the radar unit. As noted, this also avoids spurious or premature signals due to the momentary presence in the vicinity of a moving vehicle that has a radar detector, or intrusion alarms, or sometimes even of other low cost radar detectors that tend to transmit signals at microwave frequencies away from the mouth of their own detection horn. This latter problem is largely overcome due to the requirement for 2 consecutive sweeps of high level detection.

An alarm sequence for both low threshold level penetrations and high threshold level penetrations has been described, whereby noise may be discriminated so as to avoid unnecessary alarms, but whereby either a gradually increasing signal or a suddenly noted high level signal will cause an alarm that is meaningful. Circuits have been described that permit the continual adjustment of sensitivity of the radar detection device, so that in circumstances of extreme microwave noise, the sensitivity can be reduced with still the very high probability of alamr indication as soon as possible in the event of a microwave signal at either of the X-band or K-band frequencies being detected over a sufficient number of consecutive sweeps that the possibility of noise or a spurious signal can be eliminated.

The scope of the present invention is defined by the appended claims.

What is claimed is:

1. A radar detection and signal processing circuit having a microwave frequency receiving antenna and a local oscillator where signals from each are fed into a first mixer, and in the presence of a signal being received by said antenna an intermediate frequency signal is fed from said first mixer to a second mixer together with a signal from a swept frequency oscillator, where the output from said second mixer is fed to a band pass filter so that for each sweep of said swept frequency oscillator a pair of signals of substantially predetermined time spacing appears at the output of band pass filter, and further comprising:

a detector for frequency modulated intermediate frequency signals at the output of said band pass filter, said detector having at least a first output signal that is fed to two pairs of complimentary paired comparators, the outputs of which are set to low and high threshold levels;

where the first pair of complimentary comparators has a low threshold level output, and said output is examined by a microprocessor against a clock which divides each sweep period of said swept frequency oscillator into a plurality of time cells; there being storage means for storing low threshold detection incidence information, so that the incidence of detected low threshold signals at a level above said low threshold level in a pair of spaced time cells over a first given number of consecutive sweeps causes an alarm;

and the second pair of complimentary comparators has a high threshold level output, and said output is examined by said microprocessor against said clock and plurality of time cells; there being storage means for storing high threshold detection incidence information, so that the incidence of detected high threshold signals at a level above said high threshold level in a pair of spaced time cells over a second given number of consecutive sweeps causes an alarm;

and said first given number is greater than said second given number.

2. The radar detection circuit of claim 1, where said second given number is 2.

3. The radar detection circuit of claim 2, where said first given number is 6.

4. The radar detection circuit of claim 3, having alarm flag setting means so that after 3 successive sweeps have detected spaced low threshold signals in a pair of time cells, a potential alarm flag is set by said microprocesor, and having further means for setting an alarm after a further immediately successive 3 sweeps have detected spaced low threshold signals in a pair of time cells.

5. The radar detection circuit of claim 2, having alarm flag setting means so that after there is a first detected high threshold signal in each of a pair of time cells that are spaced apart within a predetermined limit, a potential alarm flag is set by said microprocessor, and having further means for setting an alarm if there is a further detected high threshold signal in each of said pair of spaced time cells in the next successive sweep.

6. The radar detection circuit of claim 5, where the stepped reference level output is stepped through from 16 to 32 levels.

7. The radar detection circuit of claim 1, having means for comparing and adjusting said low threshold level against a reference level so that, if there are more than a given range of detected low threshold signals in any one sweep, the low threshold level is adjusted upwards; and if there are fewer than a second range of detected low threshold signals in any one sweep, the low threshold level is adjusted downwards.

8. The radar detection circuit of claim 7, where the first range of detections per sweep is 6 to 8; and where the second range of detections per sweep is 3 or 4.

9. The radar detection circuit of claim 7, having means so that when said low threshold output is examined and there are more than a given number of low level detections in a given number of time cells in any one sweep, the low threshold level will be immediately adjusted upwards.

10. The radar detection circuit of claim 9, where the low threshold detection adjustment is made if there is more than one detection in a group of 10 time cells in any one sweep.

11. The radar detection circuit of claim 7, having low threshold override means such that if high threshold signals are detected in any one sweep, the low threshold signals in the next sweep are ignored as to alarm status initiation.

12. The radar detection circuit of claim 7, where said low threshold is adjusted upwards if more than one detection in any group of 10 time cells is noted, thereby so as to adjust the sensitivity of low threshold signal detection.

13. The radar detection circuit of claim 1, where the ratio of the high threshold level to the low threshold level is fixed.

14. The radar detection circuit of claim 1, having latch means on the low threshold output from the first pair of complementary comparators, which latch means holds the comparator output at its signal detected level for each time cell period; and means for resetting said latch for the next time cell, under the control of said clock.

15. The radar detection circuit of claim 1, having comparator means that are such that when there is an alarm, said second output signal from said detector is compared against a stepped reference level output from said microprocessor to determine the relative level of said second output signal; and further having signal level indicator means by which an appropriate signal level indication may be made by said circuit.

16. The radar detection circuit of claim 1, where the microwave frequency to be detected is 10.525 Ghz the first intermediate frequency from said first mixer is 1.033 GHz, and the centre frequency of said band pass filter is 10 MHz.

17. The radar detection circuit of claim 1, where the microwave frequency to be detected is 24.505 GHz, the first intermediate frequency from said first mixer is 1.033 GHz, and the centre frequency of said band pass filter is 10 MHz.

* * * * *